(12) United States Patent
Choi

(10) Patent No.: US 7,228,106 B2
(45) Date of Patent: Jun. 5, 2007

(54) METHOD AND APPARATUS FOR ADJUSTING USAGE OF DSP OF HANDHELD TERMINAL

(75) Inventor: Ga-Na Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 456 days.

(21) Appl. No.: 10/403,026

(22) Filed: Apr. 1, 2003

(65) Prior Publication Data
US 2004/0203449 A1 Oct. 14, 2004

(30) Foreign Application Priority Data
May 30, 2002 (KR) .................. 10-2002-0030358

(51) Int. Cl.
*H04B 17/00* (2006.01)
(52) U.S. Cl. ............. 455/67.11; 455/522; 455/226.1; 455/230; 455/266; 455/423
(58) Field of Classification Search ........... 455/67.11, 455/226.1, 226.2, 230, 266, 423, 522
See application file for complete search history.

(56) References Cited

U.S. PATENT DOCUMENTS

| | | | | |
|---|---|---|---|---|
| 5,287,556 A | * | 2/1994 | Cahill | 455/266 |
| 5,669,064 A | * | 9/1997 | Iseyama | 455/517 |
| 5,873,028 A | * | 2/1999 | Nakano et al. | 455/69 |
| 6,539,205 B1 | * | 3/2003 | Wan et al. | 370/465 |
| 6,804,531 B2 | * | 10/2004 | Komatsu | 455/522 |
| 6,963,753 B1 | * | 11/2005 | Hamabe | 455/522 |

FOREIGN PATENT DOCUMENTS

| | | |
|---|---|---|
| EP | 1179934 A1 | 2/2002 |
| JP | 11-017572 | 1/1999 |
| JP | 2002-016961 | 1/2002 |
| JP | 2002-208882 | 7/2002 |

OTHER PUBLICATIONS

Japanese Office Action dated Aug. 29, 2005.

* cited by examiner

*Primary Examiner*—Matthew Anderson
*Assistant Examiner*—Sanh Phu
(74) *Attorney, Agent, or Firm*—KED & Associates, LLP

(57) ABSTRACT

A method and apparatus for adjusting usage of digital signal processing (DSP) in a handheld terminal receives reception level data and reception quality data from a network, compares the received reception level data value and reception quality data value with pre-stored basis values, and then adjusts present usage of DSP based on the comparison result. Through this method and apparatus, usage of digital signal processing elements in the terminal is automatically optimized, thereby providing stable communication service to users.

25 Claims, 2 Drawing Sheets

METHOD AND APPARATUS FOR ADJUSTING USAGE OF DSP OF HANDHELD TERMINAL

BACKGROUND OF THE INVENTION

1. Field of the Invention

The present invention relates to a handheld terminal and in particular to a method and an apparatus for optimizing usage of DSP (digital signal processing) relating to resources of a handheld terminal.

2. Background of the Related Art

In a handheld terminal, a basis value for using a resource is set. As a result, the performance of the terminal is limited by the range of the set basis value. Also, handheld terminals communicate with a network to determine the network's capabilities. When a basis value of the handheld terminal is different from a capability supported by the network, the terminal adjusts the basis value through a negotiation process with the network.

The handheld terminal can, for example, adjust a data transmission speed flexibly according to a protocol by checking whether the network environment is stable or unstable through the negotiation process. However, because the data transmission speed adjusting operation is performed based on the network capability, a method for using resources of the handheld terminal efficiently is not considered.

In general, the network checks a radio channel with reference to a measurement report and allocates the channel a full rate or half rate to manage limited resources efficiently on the basis of the checking result. For example, when a transmission state of the network is unstable, the network allocates the half rate in order to receive more users. More specifically, in the conventional art although data speed is adjusted according to performance of the network, a process for using resources of the handheld terminal efficiently is not considered.

Accordingly, in the conventional art although the handheld terminal supports only the full rate and the network is in the unstable state, in a processing performance of the handheld terminal, only resources fixed to the existing algorithm are used.

However, in the handheld terminal in accordance with the conventional art, in a condition exceeding a processing capability of DSP, throughput of DSP is reduced. And, in the network unstable state, communication quality is lowered, a communication disable state occurs, or in the worst case the handheld terminal may be powered-off. In order to reduce throughput of the DSP, a user has to disable a DSP usage increasing factor or resource manually. However, because it is difficult for the general user to disable the factor or resource, the user may not use an interface appropriately.

In addition, in an application region interlocking with a DTE (data terminal equipment) such as a PC (personal computer) and a PDA (personal digital assistant), although the user knows well detailed contents of specification (V.25 ter, etc.) and sets a specification value using "at command", an application is impossible because a terminal initialization order (for example; factory reset) by a program therein is received. It is therefore impossible to actually reduce usage of DSP. More specifically, when the network environment is unstable, it is impossible to use resources efficiently because the handheld terminal sets a communication state with the network using fixed basis values for determining a memory, a FIFO (first-in first-out) size, a data frame size, and application of resources (factors) which influence DSP (data compression, DTX (discontinuous transmission usage), etc.,), to name a few.

In addition, in application interlocking with the DTE (PC, PDA, additional terminal, etc.), the user can use an interface such as an ITU (international telecommunication union) V.25 ter, a GSM (Global System for Mobile Communication) 07.07, and a GSM 07.05 as occasion demands. In that case, the user has to have a thorough understanding of the mechanical specification thereof and accurately apply the specification manually. Because it is impossible to apply the specification accurately, system performance is degraded.

In addition, in interlocking with an application program of the DTE, a terminal basis value resetting phenomenon occurs irregularly due to characteristics of the application program. In that case, although the user knows well about contents of the specification, it is impossible for the user to apply the specification smoothly because the specification is automatically varied by the application program.

As described above, in the conventional terminal because it is impossible for the user to use resources efficiently, usage of DSP cannot be reduced. In addition, in a condition exceeding the DSP processing capability, throughput of the DSP is lowered in a network unstable state, communication quality is lowered, a communication impossible state occurs, and in the worst case the handheld terminal is powered-off.

SUMMARY OF THE INVENTION

It is an object of the present invention to provide a method and apparatus for adjusting the usage of DSP of a handheld terminal by automatically setting the terminal in an optimum state, and moreover by providing a stable communication service to a user by automatically adjusting usage (throughout) of the terminal based on a network state.

These and other objects and advantages are achieved by providing a method for adjusting usage of DSP of a handheld terminal by receiving reception level data and reception quality data from a network, and comparing the received reception level data value and reception quality data value with pre-stored basis values and adjusting present usage of DSP based on the comparison result.

The present invention is also an apparatus for adjusting usage of DSP of a handheld terminal, which apparatus includes a storing unit for pre-storing first and second basis values about reception level data and reception quality data, a radio communication unit for receiving reception level data and reception quality data from a network, and a microcomputer for comparing the received reception level data and reception quality data with the pre-stored basis values and adjusting present usage of DSP about each resource on the basis of the comparison result.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

In accordance with a preferred embodiment, the method and apparatus of the present invention for adjusting usage of digital signal processing (DSP) of a handheld terminal optimizes the terminal automatically and provide a stable communication service to a user by receiving reception level data and reception communication data from a network. The received reception level data and the received reception quality data are then compared with a pre-stored reference value, and the present usage of a DSP is adjusted based on the comparison result.

Figure 1:
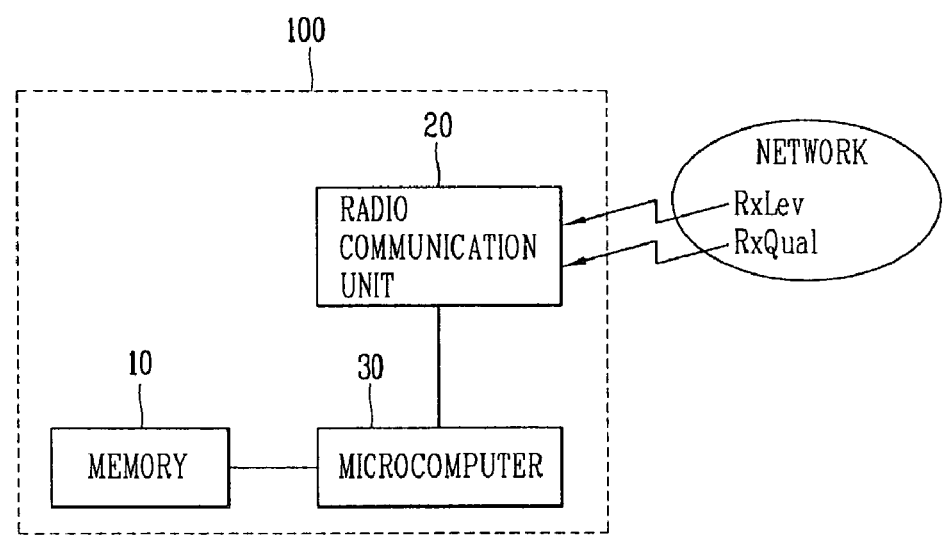
FIG. 1 is a block diagram of a DSP usage adjusting apparatus of a handheld terminal in accordance with one embodiment of the present invention.

FIG. 1 is a block diagram showing a DSP usage adjusting apparatus of a handheld terminal in accordance one embodiment of the present invention. The apparatus 100 includes a memory 10, a radio communication unit 20, and a microcomputer 30. The memory pre-stores a first basis value (S1) about a reception level, a second basis value (S2) about a reception quality, DSP usage information in a idle state (DSPbase) and maximum usage information of DSP (DSPmax). The radio communication unit periodically receives reception level data (RxLev) and reception quality data (RxQual) from a network. And, the microcomputer compares the reception level data value (RxLev) received from the radio communication unit with the first basis value (S1), and compares the reception quality data value (RxQual) with the second basis value (S2). The microcomputer also calculates present usage (X) of DSP about each resource when it is judged as a network unstable state in the comparison result, and adjusts the calculated present usage (X) of the DSP so as not to be greater than the pre-stored maximum usage (DSPmax) of the DSP. Herein, the present usage (X) of the DSP preferably corresponds to a value calculated by adding reference usage of the DSP about the n-number of resources sequentially.

Figure 2:
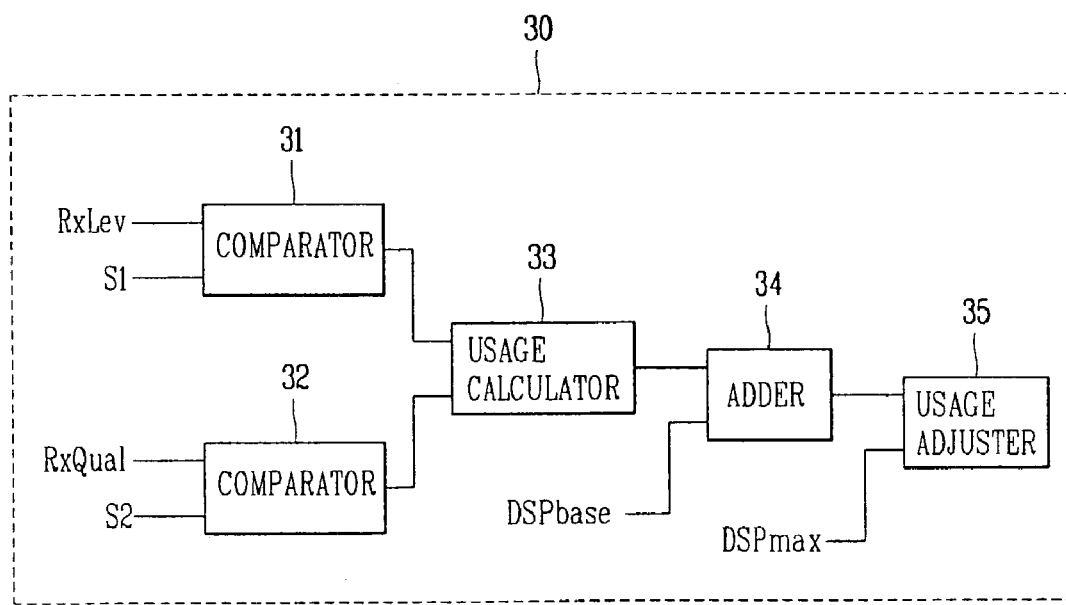
FIG. 2 is a block diagram of a microcomputer of the DSP usage adjusting apparatus of the handheld terminal in accordance with an embodiment of the present invention.

FIG. 2 is a block diagram showing one way the microcomputer may be constructed in accordance with the present invention. As shown, the microcomputer includes a comparator 31, a comparator 32, a usage calculator 33 an adder 34, and a usage adjuster 35. The comparator 31 compares the reception level data value (RxLev) with the first basis value (S1) and outputs a comparison result. Comparator 32 compares the reception quality data value (RxQual) with the second basis value (S2) and outputs a comparison result. The usage calculator calculates usage (fi; $0<i\leq n$) of the DSP about resources based on the comparison results output from the comparators when the reception data Value (RxLev) is less than the first basis value (S1) or the reception quality data value (RxQual) is greater than the second basis value (S2). The adder calculates present usage (X) of the DSP by adding the pre-stored usage (DSPbase) of the DSP in the idle state to the usage (fi; $0<i\leq n$) of the DSP calculated by the usage calculator. And, the usage adjuster 35 adjusts the present usage (X) of the DSP calculated in the adder so as not to be greater than the maximum usage (DSPmax) of the pre-stored DSP.

In accordance with the present invention, DSP (digital signal processing) means various digital signal processing techniques for improving the accuracy and reliability of communications. However, there are various factors influencing the DSP processing procedure. These factors include but are not limited to all digital data processing related to voice, hand-over, a kind of voice codec, data compression, DTX discontinuous transmission usage. Accordingly, in the present invention, the handheld terminal checks a state of a radio interface where itself belongs, judges whether the network environment is in a stable state or an unstable state, and when it is judged as the unstable state in the judging result, the handheld terminal adjusts usage of the DSP by performing a monitoring algorithm.

Figure 3:
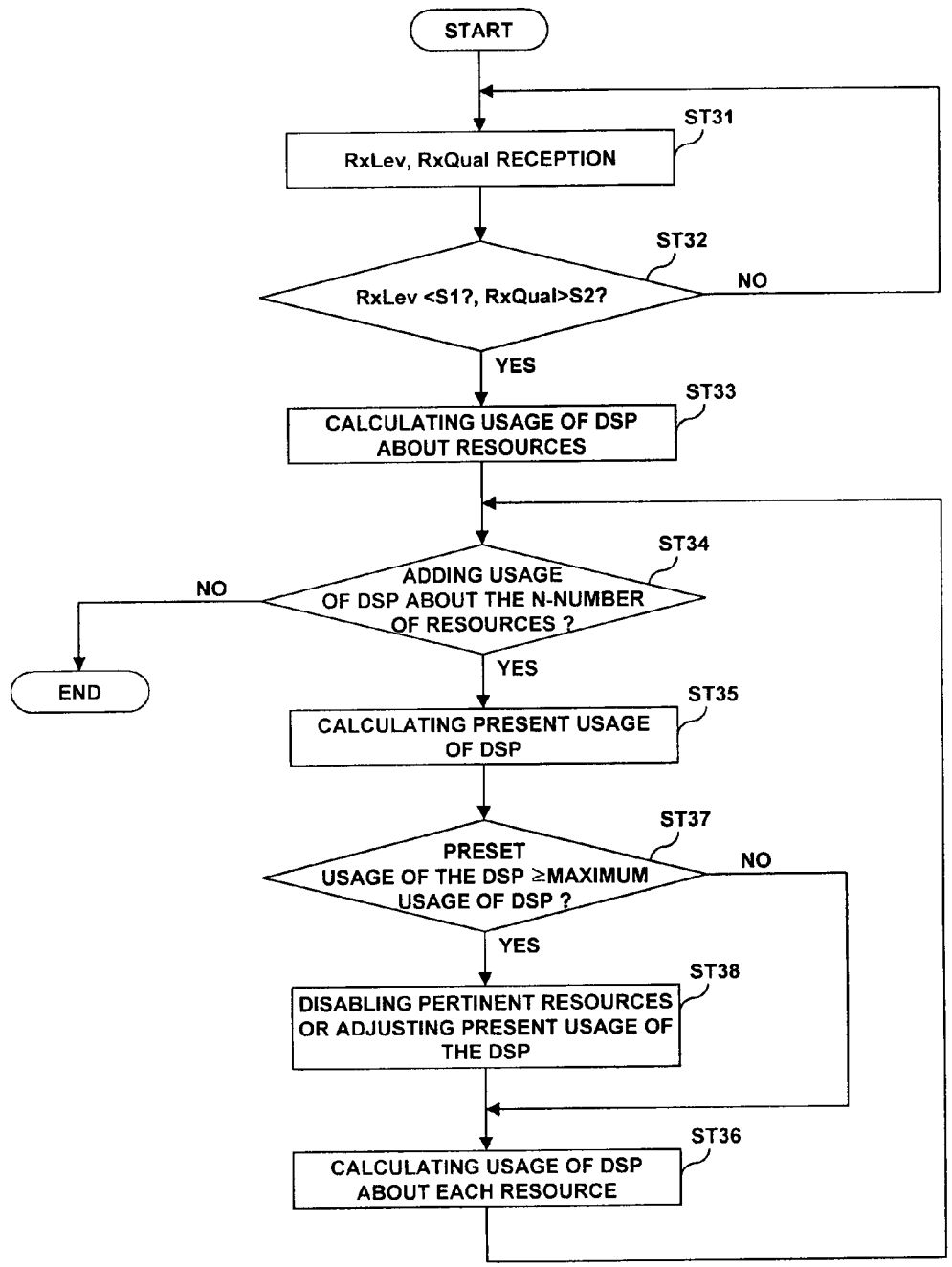
FIG. 3 is a flow chart showing steps included in a DSP usage adjusting method of a handheld terminal in accordance with one embodiment of the present invention

FIG. 3 is a flow chart showing steps included in a DSP usage adjusting method of a handheld terminal in accordance with one embodiment of the present invention. This method includes as an additional step, pre-storing in memory the first basis value (S1) about the reception level, the second basis value about the reception quality (S2), usage of the DSP in the idle state (DSPbase) and maximum usage of the DSP (DSPmax). The first basis value (S1) of the reception level, the second basis value of the reception quality (S2), usage of the DSP in the idle state (DSPbase), and maximum usage of the DSP n(DSPmax) may be pre-calculated, for example, by a manufacturer.

In a next step, the reception level data (RxLev) and the reception quality data (RxQual) is received, for example in a radio communication unit for judging the network environment (stable state or unstable state) from a BTS (base station transceiver system). The received reception level data value (RxLev) and the reception quality data value (RxQual) is then output to a microcomputer as shown at step ST31.

In a next step, a first comparator preferably but not necessarily included in of microcomputer compares the reception level data value (Rx Lev) with the first basis value (S1) pre-stored in the memory and outputs a comparison result to a usage calculator. A second comparator preferably but not necessarily included in the microcomputer compares the reception quality data value (RxQual) with the second basis value (S2) pre-stored in the memory and outputs the comparison result to the usage calculator.

When the reception level data value (Rx Lev) is less than the first basis value (S1) or the reception quality data value (RxQual) is greater than the second basis value (S2) in the comparison results output from the comparators, the usage calculator determines that the network environment is in an unstable state, as shown at step ST32. When the network environment is in an unstable state, the usage calculator calculates usage (fi; $0<i\leq n$) of the DSP about resources and outputs the calculated usage (fi) of the DSP to an adder, as shown at step ST33.

The adder calculates present usage (X) of the DSP by adding the pre-stored usage (DSPbase) of the DSP in the idle state to the calculated usage (fi) of the DSP and outputs the present usage (X) of the DSP to a usage adjuster. Herein, the added usage (DSPbase+fi; $0<i\leq n$) of the DSP may correspond to the present usage of the DSP (X). For example, the present usage (X) of the DSP may be a value calculated by sequentially adding DSP reference usage (fi; $0<i\leq n$) about the n-number of resources (Ri; $0<i\leq n$) increasing usage of the DSP or adding the usage (DSPbase) of the DSP in the idle state to the sum (of the sequentially added DSP reference usage). The usage (fi; $0<i\leq n$) of the DSP about each resource is preferably stored in memory in order of function so as to not influence the basic performance of the handheld terminal, as shown at ST34 and ST35. When throughput of the DSP is increased or decreased, usage of the DSP is also increased or decreased. Thus, in accordance with one embodiment of the invention, throughput of the DSP and usage of the DSP can have the same meaning, but this is not necessarily so.

In a next step, the usage adjuster compares the present usage (X) of the DSP outputted from the adder with the maximum usage (DSPmax) of the DSP pre-stored in the memory as shown at step ST37. When the present usage (X) of the DSP is not less than or same with the maximum usage (DSPmax) of the DSP, the usage adjuster adjusts the present usage (X) of the DSP so as not to be greater than the maximum DSP (DSPmax) of the DSP or adjusts the terminal environment by disabling the usage (fi; 0<i≦n) of the DSP calculated from the usage calculator (disabling a certain resources (Ri; 0<i≦n) increasing usage of the DSP), as shown at step ST38. Herein, the maximum usage (DSPmax) of the DSP may be pre-stored by the terminal manufacturer, and the maximum usage (DSPmax) of the DSP may correspond to a maximum value for processing a digital signal appropriately in the terminal.

When the present usage (X) of the DSP is not greater than or when the step ST38 is finished, usage of the DSP by each resource is calculated and each calculated DSP usage is added through the process ST34 as shown at step ST36.

Accordingly, in the present invention when data values (RxLev) (RxQual) about the network environment are compared with the basis values (S1)(S2) and the unstable state of the network environment is judged through the comparison, present usage (X) of the DSP is calculated based on the database (S1, S2, DSPbase, DSPmax) pre-stored in the memory 10. Thus the calculated present usage (X) of the DSP exceeds the pre-stored maximum usage (DSPmax), insignificant resources are sequentially disabled while throughput of DSP is increased to the most or the present usage (X) of the DSP so as not to be greater than the maximum usage (DSPmax) of the DSP.

As described above, in the present invention, by automatically adjusting usage of the DSP so as not to be greater than a maximum usage (DSPmax) of the DSP or disabling a certain resources (Ri; 0<i≦n) increasing usage of the DSP according to the network environment, it is possible to automatically set the handheld terminal in an optimum state.

In addition, by automatically adjusting usage of the DSP so as not to be greater than a maximum usage (DSPmax) of the DSP or disabling a certain resources (Ri; 0<i≦n) increasing usage of the DSP according to the network environment, it is possible to provide a stable communication service to a user.

In addition, by automatically adjusting usage of the DSP according to the network environment, there is no need to fix basis values for determining an application of resources or factors (data compression, DTX (discontinuous transmission usage), etc., (Ri; 0<i≦n) and efficient resources (Ri; 0<i≦n) management of the terminal can be performed in other networks, it is possible to provide a stable communication service to a user.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for adjusting usage of digital signal processing (DSP) of a handheld terminal in a mobile communications network, comprising:

receiving reception level data and reception quality data at the handheld device from the mobile communications network;

comparing the reception level data and reception quality data with pre-stored basis values; and adjusting present usage of DSP based on a result of the comparing, the DSP comprising processing for improving an accuracy and reliability of communications between the handheld terminal and the mobile communications network.

2. The method of claim 1, wherein the present usage adjusting includes:

pre-storing a maximum usage information of DSP; and adjusting present usage of DSP so as not to be greater than the pre-stored maximum usage information of DSP.

3. The method of claim 1, wherein the present usage adjusting includes:

adjusting present usage of DSP for at least one resource when it is judged the network environment is in an unstable state based on the comparison result.

4. The method of claim 1, wherein the present usage adjusting includes:

calculating present usage of DSP for at least one resource when it is judged the network environment is in an unstable state based on the comparison result; and adjusting the calculated present usage of DSP so as not to be greater than the pre-stored maximum usage of DSP.

5. The method of claim 1, wherein present usage of DSP is calculated by adding a value obtained by sequentially adding a reference usage of DSP about n-number of resources to usage of DSP in a idle state.

6. The method of claim 1, wherein the present usage adjusting includes:

pre-storing a first basis value of a reception level, a second basis value of a reception quality, usage of DSP in a idle state, and maximum usage of DSP;

calculating usage of DSP of at least one resource when a reception level data value is less than the first basis value or a reception quality data value is greater than the second basis value;

calculating present usage of DSP by adding the calculated usage of DSP to the pre-stored usage of the DSP in the idle state; and adjusting the calculated present usage of DSP so as not to be greater than the pre-stored maximum usage of DSP.

7. The method of claim 6, wherein present usage of the DSP is calculated by adding a value obtained by sequentially adding reference usage of the DSP about n-number of resources to usage of the DSP in the idle state.

8. An apparatus for adjusting usage of digital signal processing (DSP) of a handheld terminal in a mobile communications network, comprising:

a storing unit which pre-stores first and second basis values of reception level data and reception quality data respectively;

a radio communication unit which receives reception level data and reception quality data from the mobile communications network; and a processor which compares the received reception level data and reception quality data with the pre-stored basis values and adjusts present usage of DSP of at least one resource based on a comparison result, the DSP comprising processing for improving an accuracy and reliability of communications between the handheld terminal and the mobile communications network.

9. The apparatus of claim 8, wherein the processor adjusts present usage of the DSP for said resource when the processor determines that a network environment is in an unstable state based on the comparison result.

10. The apparatus of claim 8, wherein the storing unit pre-stores usage of DSP in a idle state and maximum usage information of DSP.

11. The apparatus of claim 10, wherein the processor calculates present usage of DSP by adding sequentially reference usage of DSP about n-number of resources and adjusting the calculated present usage of the DSP so as to not be greater than the pre-stored maximum usage of DSP, when the processor determines that a network environment is in an unstable state based on the comparison result.

12. The apparatus of claim 10, wherein the processor calculates usage of the DSP for said resource when the reception level data value is less than the reception level basis value or the reception quality data value is greater than the reception quality basis value, calculates present usage of DSP by adding the calculated usage of the DSP to the pre-stored usage of the DSP in the idle state, and adjusts the calculated present usage of the DSP so as not to be greater than the pre-stored maximum usage of the DSP.

13. The apparatus of claim 10, wherein the processor includes:
a comparator which compares the reception level data value with the first basis value, compares the reception quality data value with the second basis value, and outputs comparison results;
a usage calculator which calculates usage of DSP for said resource when the reception level data value is less than the first basis value or the reception quality data value is greater than the second basis value;
an adder which calculates present usage of DSP by adding usage of the DSP in the idle state to the calculated usage of the DSP from the usage calculator; and
a usage, adjuster which adjusts the present usage of the DSP from the adder so as not to be greater than the pre-stored maximum usage of the DSP.

14. The apparatus of claim 8, wherein the present usage of the DSP is a value calculated by adding reference usage of the DSP about n-number of resources sequentially.

15. A method for controlling communications in a terminal in a mobile communications network, comprising:
comparing reception state information received at the terminal from the mobile communications network to reference information; and
automatically adjusting usage of a digital signal processor of the terminal based on a result of the comparing, the digital signal processor usage including processing for improving an accuracy and reliability of communications between the terminal and the mobile communications network,
wherein the reception state information includes reception level information and reception quality information, and wherein the reference information includes a predetermined reception level value and a predetermined reception quality value.

16. The method of claim 15, wherein the comparing includes:
comparing the reception level information from the network with the predetermined reference level value; and
comparing the reception quality information from the network with the predetermined reception quality value.

17. The method of claim 15, further comprising:
determining a stability state of the network based on the comparison result; and
calculating usage of the digital signal processor when the network is determined to be in an unstable state.

18. The method of claim 17, wherein the calculating includes:
sequentially adding reference usage of the digital signal processor for a plurality of resources, said usage of the digital signal processor corresponding to a result of the adding.

19. The method of claim 17, wherein the adjusting includes:
adjusting the calculated usage of the digital signal processor so as not to be greater than a predetermined maximum usage level.

20. The method of claim 17, wherein the determining includes determining that the network is in an unstable state when at least one of the following conditions is satisfied:
(a) when reception level information from the network is less than a reception level value included in the reference information, and
(b) when reception quality information from the network is greater than a reception quality value included in the reference information.

21. A communications terminal in a mobile communications network, comprising:
a comparator which compares reception state information received from the mobile communications network to reference information; and
a processor which automatically adjusts digital signal processing in the terminal based on an output of the comparator, the digital signal processing comprising processing for improving an accuracy and reliability of communications between the communications terminal and the mobile communications network,
wherein the reception state information includes reception level information and reception quality information, and wherein the reference information includes a predetermined reception level value and a predetermined reception quality value.

22. The terminal of claim 21, wherein the comparator compares the reception level information from the network with the predetermined reference level value, and compares the reception quality information from the network with the predetermined reception quality value.

23. The terminal of claim 21, wherein the processor determines a stability state of the network based on results of the comparators, and calculates usage of the digital signal processor when the network is determined to be in an unstable state.

24. The terminal of claim 23, wherein the processor sequentially adds reference usage of the digital signal processing performed for a plurality of resources, said usage corresponding to a result of the addition.

25. The terminal of claim 23, wherein the processor adjusts the calculated usage of the digital signal processing so as not to be greater than a predetermined maximum usage level.

* * * * *